Patented Dec. 23, 1952

2,623,054

UNITED STATES PATENT OFFICE 2,623,054

STEROID ALDEHYDES

Robert H. Levin, A Vern McIntosh, Jr., and George B. Spero, Kalamazoo, Mich., assignors to The Upjohn Company, Kalamazoo, Mich., a corporation of Michigan No Drawing. Application October 2, 1947, Serial No. 777,577

15 Claims. (Cl. 260—397.4)

The present invention relates to steroid aldehydes and to a method for the production thereof. The invention is more specifically concerned with certain steroid aldehydes of the formula:

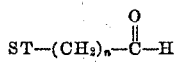

wherein ST represents a pregnane nucleus attached to the side-chain at the 20 position, and $n$ is zero, one or two, and with a method for the production of the said steroid aldehydes from steroid thioesters having a side-chain of corresponding length.

It is an object of the present invention to provide novel steroid aldehydes. A further object of the invention is the provision of a novel process for the preparation of steroid aldehydes from steroid thioesters. Other objects of the invention will become apparent hereinafter.

Members of the new group of compounds have been prepared, isolated, and found to be valuable intermediates in the preparation of more complex organic molecules, including certain hormones.

The method of the present invention essentially comprises desulfurization of a steroid thioester to a steroid aldehyde having the same number of carbon atoms in the side-chain.

Among thioesters which may be employed as suitable starting materials for the preparation of the steroid aldehydes are thioester derivatives of the bile acids, e. g., cholanic acid, of the formula:

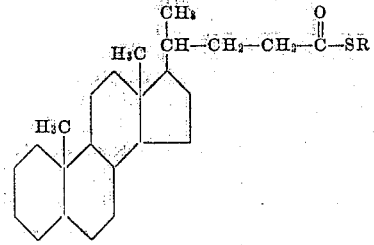

thioester derivatives of (delta-5)-cholenic acid, of the formula:

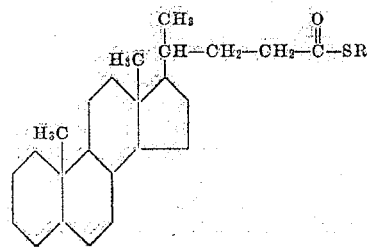

thioesters of lithocholic acid (3-hydroxycholamic acid), of the formula:

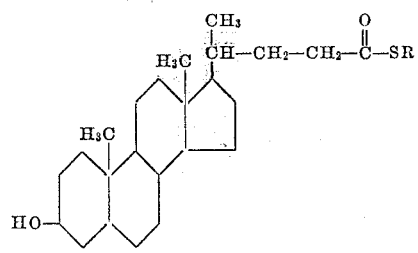

thioesters of desoxycholic acid (3,12-dihydroxycholanic acid), of the formula:

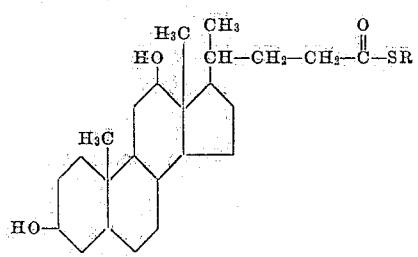

thioesters of cholic acid (3,7,12-trihydroxycholanic acid), of the formula:

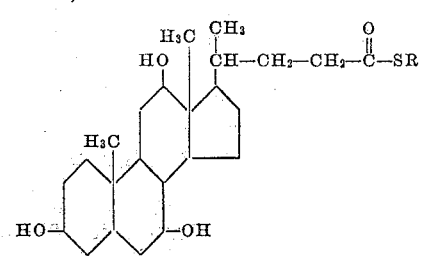

and thioesters of 3,7,8,12 - tetrahydroxycholanic acid, of the formula:

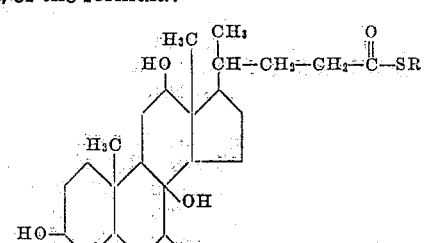

wherein R is a hydrocarbon radical. Likewise, other thioesters of unsaturated bile acids, such as 3-hydroxy-(delta-5)-cholenic and 3-hydroxy-(delta-5,7)-choladienic acids, and ester or ether derivatives of the above hydroxy compounds are suitable starting materials.

Other suitable thioesters are those having one fewer side-chain carbon atom, i. e., the thioesters of nor-cholanic acids, and related compounds having substituents as given above in the cholanic series. The nor-cholanic series has the general structure:

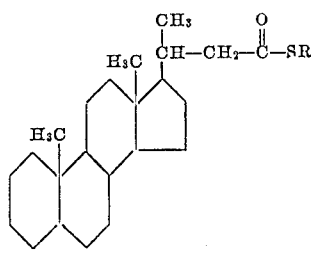

The thioesters of bisnor-cholanic acids have two fewer carbon atoms in the side-chain, e. g.:

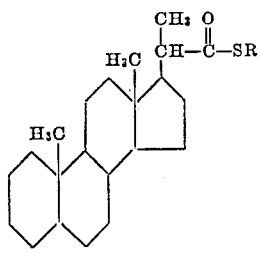

and these compounds are also suitable starting materials.

Thioesters having the designated side-chains and additional substituents in the nucleus, such as hydroxyl groups, esters and ether derivatives of hydroxyl groups, including i-ethers and i-esters; ketones, ketone derivatives, enol ethers and esters of ketones; amines; protected, e. g., as dihalide or hydrohalide, or unprotected double bonds; and halogen atoms, may also be used as starting materials. Some compounds having the mentioned substituents have been indicated for the first series, but any compound having the prescribed pregnane nucleus and the specified

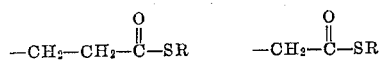

or

side-chain, regardless of other nuclear substituents, may be employed. For example, thioesters of 3,6-diketoallocholanic acid, 3,11-diketocholanic acid, 3-chloro-(delta 5)-cholenic acid, 3-acetoxy-(delta-5)-cholenic acid, 3-methoxy-(delta 5)-nor-cholanic acid, 3,12-diethoxy-nor-cholanic acid, and 3-acetoxy-(delta 5)-bisnor-cholenic acid are entirely satisfactory starting materials. Stereoconfiguration of the starting thioester is immaterial, as aldehydes may be produced with facility regardless of the space factor.

The selected steroid acid may be converted to the corresponding thioester by either of two procedures, both of which may proceed through the acid chloride. The first (A) involves reaction of the acid halide, e. g., bromide or chloride, with a mercaptan, preferably in the presence of an acid-binding agent, e. g., pyridine, substituted pyridines, dimethylaniline, quinoline, or an inert organic solvent, e. g., ether, benzene, toluene, xylene, or petroleum hydrocarbons, in the presence of an acid-binding agent, e. g., pyridine, sodium bicarbonate, magnesium or calcium oxide. The second (B) involves reaction of the acid chloride with a selected metallic mercaptide, e. g., a lead, zinc, or aluminum mercaptide, in ether, according to the following sequence, as illustrated for an unsubstituted acid:

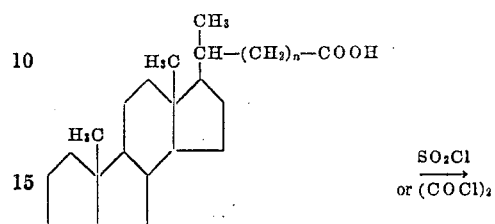

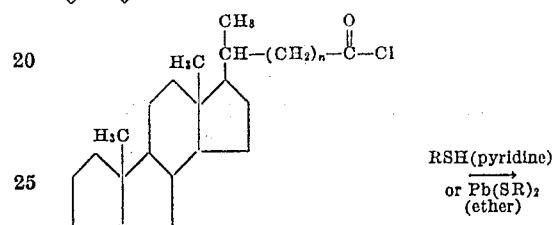

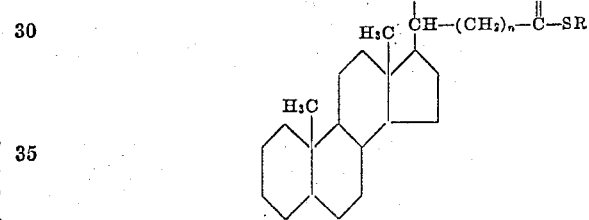

wherein: $n$ is zero, one or two; and R is a thioalcohol residue. Either of the procedures are suitable, the first apparently giving better yields of crude product, and the second apparently yielding a somewhat purer product. The thioesterification may also be accomplished from the free acid directly, by reaction with a mercaptan, with or without an esterification, e. g., acidic, catalyst.

The choice of the R radical in the starting thioester is limited only by the availability of the mercaptan or mercaptide. R may be an alkyl radical, e. g., methyl, ethyl, propyl, isopropyl, butyl, isobutyl, amyl, n-octyl, dodecyl, or the like; a cycloalkyl radical, e. g., cyclopentyl, cyclohexyl; a cycloalkylalkyl radical, e. g., cyclohexylmethyl; an aryl radical, e. g., phenyl, naphthyl; or an aralkyl radical, e. g., benzyl or phenethyl. Unsaturated aliphates and cycloaliphatics may also be employed, provided the required starting material is available. Substituted hydrocarbon radicals, e. g., chlorobenzyl, nitrophenyl, bromoethyl, aminopropyl, are also satisfactory in the starting thioester.

PROCEDURE A.—MERCAPTAN

The acid chloride, usually in an organic solvent, such as anhydrous benzene, toluene, xylene, ether, or petroleum hydrocarbons, is admixed with a selected mercaptan. Equimolar proportions are satisfactory, but an excess of mercaptan may sometimes be employed to advantage. The reaction mixture is allowed to stand at about room temperature, 15–30 hours usually being sufficient time for complete reaction. Gentle heating sometimes increases reaction rate, but is not usually necessary. Temperature range is usually about zero to about 150 degrees centigrade. The presence of an acid-binding agent is not essential, but is usually advantageous in increasing the reaction rate. The reaction product may be worked up with water and an organic solvent, e. g., ether, aqueous portions extracted, and combined organic layer washed with water, dilute alkali, dilute acid, and finally again with water. After drying the neutral fraction and evaporating the solvent, the residual oil may be crystallized from a suitable solvent, e. g., alcohol, to yield the desired thioester, usually a stable solid.

PROCEDURE B.—LEAD MERCAPTIDE

The acid chloride, usually in an inert organic solvent, is added to a selected metallic mercaptide and an inert organic solvent, or vice versa. Equimolar proportions are satisfactory; other ratios may be used if desired. Temperature range is usually about zero to 150 degrees centigrade. The reaction mixture is allowed to stand with occasional swirling, gentle heating if desired. After 15–30 hours the metallic mercaptide is usually completely converted to the metallic chloride, and the reaction product may be worked up as in Procedure A.

The thioesters are stable materials, which may be converted when a hydroxy group is present, to an acyloxy derivative of the thioester.

The following preparations are given to illustrate the preparation of suitable starting thioesters, but are in no way to be construed as limiting.

PREPARATION 1.—BENZYL 3-ALPHA,12-ALPHA-DIACETOXY-NOR-THIOCHOLANATE

To 1.5 grams (0.0033 mole) of 3-alpha,12-alpha-diacetoxy-nor-cholanic acid was added 6 milliliters (9.8 grams, 0.082 mole) of purified thionyl chloride (Fieser, Experiments in Organic Chemistry, Part II, Heath and Co., New York, 1941, p. 381). The acid dissolved within five minutes and the solution was allowed to stand, with occasional swirling, at room temperature for one hour. Twenty milliliters of a 1:1 mixture of anhydrous benzene and ether was then added and the whole evaporated to dryness in vacuo at 40 degrees centigrade. This process of treatment with benzene-ether was repeated twice to ensure complete removal of excess thionyl chloride.

To the resulting acid chloride dissolved in 10 milliliters of anhydrous benzene was added 0.4 milliliter (0.005 mole) of dry pyridine and 2 milliliters (1.12 grams, 0.009 mole) of benzyl mercaptan, a precipitate soon forming. After standing for twenty-four hours at room temperature, the mixture was diluted with 15 milliliters of water and 15 milliliters of ether, whereafter the precipitate dissolved and the ether-benzene phase was separated. The aqueous portion was extracted with two 15-milliliter portions of ether, and the combined ether-benzene layer was washed with 30-milliliter portions of water, one per cent aqueous sodium hydroxide solution, one per cent hydrochloric acid, and finally again with water. The neutral fraction was dried over anhydrous sodium sulfate, the solvent evaporated to dryness in vacuo, and the residual oil crystallized from 50 milliliters of 95 per cent alcohol to give 1.38 grams (73 per cent) of product, M. P. 147–152 degrees centigrade. After three recrystallizations from alcohol, 1.23 grams (65.5 per cent) of the benzyl thioester with a constant melting point of 154–156 degrees centigrade (corr.) was obtained.

PREPARATION 2.—ETHYL 3-ALPHA,12-ALPHA-DIFORMOXY-THIOCHOLANATE

The acid chloride (prepared from 4.5 grams (0.01 mole) of 3-alpha,12-alpha-diformoxydesoxycholic acid in the manner described in Preparation 1) was dissolved in 30 milliliters of anhydrous ether and added to 1.8 grams (0.0055 mole) of lead ethyl mercaptide covered with 20 milliliters of anhydrous ether. The mixture was allowed to stand at room temperature with occasional swirling, the yellow lead mercaptide being gradually replaced by white lead chloride. After twenty-four hours, the solution was filtered and the precipitate washed with 50 milliliters of ether. The combined ether filtrate was washed with 100 milliliters of one per cent aqueous sodium hydroxide solution and 300 milliliters of water, then dried over anhydrous sodium sulfate and evaporated to dryness in vacuo on the steam bath. The residual oil was dissolved in 50 milliliters of hot alcohol and 10 milliliters of water added. On cooling, an oil separated, taking with it all the color in the solution. Crystallization yielded 2.2 grams of material. An additional 0.32 gram of crystals was obtained by crystallizing the oil from alcohol, the total yield being 2.52 grams (51 per cent of the theoretical), M. P., 105–110 degrees centigrade. After three recrystallizations, the melting point was constant at 111–112 degrees centigrade (corr.)

PREPARATION 3.—ETHYL 3-ACETOXY-(DELTA-5)-THIOCHOLENATE (PROCEDURE A)

Three grams (0.0076 mole) of 3-acetoxy-(delta-5)-cholenic acid was placed in a 50-milliliter side-inlet flask with 6.0 milliliters (0.082 mole) of thionyl chloride and allowed to stand for one hour with occasional shaking. Fifteen milliliters of dry ether and benzene (1:1) was then added, and the solvent removed in vacuo. The addition and removal of ether-benzene was repeated three times.

Fifteen milliliters of benzene was added to the acid chloride without removal from the original flask, whereafter 0.0114 mole (0.91 milliliter) of pyridine and 0.0380 mole (2.8 milliliters) of ethyl mercaptan was added to the benzene solution. The reaction mixture was allowed to stand for one day at room temperature and was then rinsed into a 100-milliliter separatory funnel with 30 milliliters of ether and 30 milliliters of water. The ether-benzene solution was separated and washed by the procedure of Preparation 1. Two and four-tenths grams of ethyl 3-acetoxy-(delta-5)-thiocholenate, melting at 100 to 102 degrees centigrade, was obtained, the yield being 73.0 per cent.

PREPARATION 4.—ETHYL 3-ACETOXY-(DELTA-5)-THIOCHOLENATE (PROCEDURE B)

Three grams (0.0076 mole) of 3-acetoxy-(delta-5)-cholenic acid was placed in a 50-milliliter side-inlet flask with 6.0 milliliters (0.054 mole) of thionyl chloride and allowed to stand for one hour with occasional shaking. Fifteen milliliters of dry ether and benzene (1:1) was added and the solvent removed in vacuo. The addition and removal of ether-benzene was repeated three times.

Lead ethyl mercaptide was covered with 10 milliliters of anhydrous ether, and the acid chloride in 20 milliliters of anhydrous ether added thereto. The mixture was stirred for 4–6 hours and allowed to stand overnight at room temperature. The mixture was filtered and insoluble material washed with a few milliliters of ether, the filtrate transferred to a separatory funnel and washed with 50 milliliters of one per cent cold aqueous sodium hydroxide solution and 100 milliliters of water, after which the water layer was discarded. The ether phase was dried over anhydrous sodium sulfate, filtered, and evaporated to dryness. The residue was taken up in 35 to 40 milliliters of alcohol and cooled. Crystallization took place, the material was further cooled in a refrigerator, and the crystals were separated. One and seven-tenths grams of ethyl 3-acetoxy-(delta-5)-thiocholenate, melting at 101–103 degrees centigrade, was obtained.

Other suitable thioesters which may be employed as starting materials in the method of the present invention are given in the following table:

modified Raney nickel catalysts, modified Raney iron catalysts, and other modified catalysts of this type. Preparation of Raney-type catalysts is known to the art (R. Paul and G. Hilley, Compt. rendus, 206,608 (1938); U. S. Patent 2,363,311 to F. W. Breuer; Homer Adkins, "Reactions of Hydrogen with Organic Compounds over Copper-Chromium Oxide and Nickel Catalysts," University of Wisconsin Press, Madison 1937 p. 20). If such normally active Raney-type catalysts are employed, the objects of the invention cannot be accomplished as the desired aldehydes are not produced and the thioesters are quantitatively reduced to alcohols. It has now been found that, upon proper modification, a Raney-type catalyst is an effective agent for splitting C—S bonds and replacing them with C—H bonds, and thus suitable for use in the conversion of steroid thioesters to steroid aldehydes in high yields. Such modification may be

THIOESTERS OF STEROID ACIDS

| Compound | M. P., °C.[a] | Rotation[b] (alpha)$_D$ | Molecular Formula | Analyses, Per cent | | | | | |
|---|---|---|---|---|---|---|---|---|---|
| | | | | Carbon | | Hydrogen | | Sulfur | |
| | | | | Calc. | Found | Calcd. | Found | Calcd. | Found |
| ethyl 3-beta-hydroxy-(delta 5)-thiocholenate | 108.5–109.5 | −38.5 | $C_{26}H_{42}O_2S$ | 74.59 | 74.64 | 10.00 | 10.07 | 7.66 | 7.79 |
| ethyl 3-beta-formoxy-(delta 5)-thiocholenate | 81–82 | −47.5 | $C_{27}H_{42}O_3S$ | 72.60 | 72.07 | 9.48 | 9.61 | 7.18 | 7.01 |
| ethyl 3-beta-acetoxy-(delta 5)-thiocholenate | 101.5–103.5 | −40.9 | $C_{28}H_{44}O_3S$ | 72.99 | 72.92 | 9.63 | 9.69 | 6.98 | 7.36 |
| isopropyl 3-beta-acetoxy-(delta 5)-thiocholenate | 131–133 | −40.4 | $C_{29}H_{46}O_3S$ | 73.37 | 73.39 | 9.77 | 9.55 | 6.75 | 6.81 |
| tert-butyl 3-beta-acetoxy-(delta 5)-thiocholenate | 169.5–171 | −39.8 | $C_{30}H_{48}O_3S$ | 73.72 | 74.07 | 9.90 | 9.96 | 6.56 | 6.71 |
| n-hexyl-3-beta-acetoxy-(delta 5)-thiocholenate | 77.5–79.5 | −35.4 | $C_{32}H_{52}O_3S$ | 74.37 | 74.70 | 10.14 | 10.00 | 6.20 | 6.60 |
| ethyl-3-chloro-(delta 5)-thiocholenate | 103.5–105 | −30.4 | $C_{26}H_{41}OSCl$ | 71.44 | 71.51 | 9.46 | 9.58 | 8.11 | [d] 8.75 |
| ethyl-3-beta-acetoxy-5-chloro-nor-thiocholanate | 165–168 | | $C_{28}H_{43}O_3SCl$ | | | | | 6.45 | 6.32 |
| ethyl 3-beta-acetoxy-(delta 5)-bisnor-thiocholenate | 132–133 | −38.0 | $C_{26}H_{40}O_3S$ | 72.18 | 72.50 | 9.32 | 9.13 | 7.41 | 7.44 |
| ethyl 3-alpha, 12-diformoxy-thiocholanate [c] | 111–112 | +92.1 | $C_{28}H_{44}O_5S$ | 68.25 | 68.39 | 9.00 | 8.89 | 6.51 | 6.51 |
| ethyl 3-alpha-formoxy-thiocholanate | 81–82 | +41.3 | $C_{27}H_{44}O_3S$ | 72.27 | 72.53 | 9.88 | 9.74 | 7.14 | 7.23 |
| ethyl 3-alpha, 12-diacetoxy-nor-thiocholanate | 91–91.5 | +96.0 | $C_{28}H_{46}O_5S$ | 68.76 | 69.07 | 9.15 | 9.47 | 6.33 | 6.37 |
| benzyl 3-alpha, 12-alpha-diacetoxy-nor-thiocholanate | 154–156 | +95.5 | $C_{34}H_{48}O_5S$ | 71.79 | 71.56 | 8.51 | 8.79 | 5.64 | 5.66 |
| phenyl 3-alpha, 12-alpha-diacetoxy-nor-thiocholanate | 146–147 | +99.7 | $C_{33}H_{46}O_5S$ | 71.44 | 71.30 | 8.36 | 8.04 | 5.78 | 5.64 |
| phenyl 3-beta-acetoxy-(delta 5)-thiocholenate | 128.5–130 | | | 75.40 | 75.11 | 8.90 | 8.59 | 6.29 | 6.89 |
| benzyl 3-beta-acetoxy-(delta 5)-thiocholenate | 85–86.5 | | | 75.67 | 75.77 | 9.05 | 8.72 | | |
| ethyl 3-alpha, 7-alpha, 12-alpha-triformoxythiocholanate | c. 128 | | | 64.77 | 64.78 | 8.44 | 8.07 | | |
| ethyl 3-alpha-hydroxy-12-alpha-acetoxythiocholanate | | | | | | 9.54 | 9.34 | | |
| ethyl 3-methoxy-(delta-5)-bisnor-thiocholenate | 94–96 | | | | | | | | |
| ethyl 3-benzoyloxy-(delta-5)-thiocholenate | 178–182 | | | | | | | | |
| ethyl thiodehydrocholate | 244–246.5 | | | | | | | | |

[a] All m. p.'s corrected.
[b] Rotations taken at approximately 25° C. in chloroform with a 1 cm. tube.
[c] Desoxycholic acid is formulated as 3-alpha, 12-alpha, according to the latest evidence (Ann. Rev. Biochem. 15, 162 (1946)).
[d] Chlorine analysis.

The presence or absence of substituents in the dimethylcyclopentanopolyhydrophenanthrene nucleus of the starting thioester, such as hydroxy, ester or ether groups convertible to hydroxy with the aid of hydrolysis, halogen, double bonds, and the like, is immaterial to the present process, as it has been found that sensitive groups commonly present in the steroid nucleus are stable under the conditions of reaction. The stability, particularly that of a nuclear double bond, is of considerable value, as any double bonds do not require protection during preparation of the aldehyde from the thioester.

Desulfurization agents which may be employed in the method of the present invention include accomplished by allowing the Raney-type catalyst to age considerably, or by treating a normally active Raney-type catalyst with a hydrogen acceptor, e. g., an ethylene, or a carbonyl compound such as a ketone, or an aldehyde. This treatment may be advantageously carried out by refluxing the normally active catalyst with the hydrogen acceptor to modify the catalyst sufficiently, usually for a period of an hour or more, depending upon its initial catalytic activity, ratios of catalyst to hydrogen acceptor, et cetera. The modified Raney-type compositions will desulfurize, that is convert a C—S bond to a C—H bond, but are not possessive of the reducing activity of normally active Raney-type catalysts, and thus do not reduce carbonyl groups or ethylenic linkages in the compounds treated or products produced. This is because the modification, i. e., reaction with a hydrogen acceptor, apparently removes adsorbed hydrogen from the surfaces of the Raney-type composition, or, for some other unknown reason, eliminates the reducing activity of the normally active Raney-type catalysts. Acetone has been found especially suitable for modification of the Raney-type catalyst, which, for purposes of convenience, is usually Raney-nickel. Any other suitable hydrogen acceptor or Raney-type catalyst may also be employed, however.

The desulfurization is conducted conveniently by mixing together the modified Raney-type catalyst and a selected steroid thioester. The reactants are maintained in contact for a period of time sufficient to produce desulfurization of the starting thioester, with production of the corresponding side-chain-length aldehyde. Agitation is desirable for intimate contact of reactants, and heating is likewise advantageous in some instances. The temperature is ordinarily maintained between about 15 degrees centigrade and 100 degrees centigrade. Common organic solvents, such as acetone, alcohol, ether, and the like, or any organic solvent in which the thioester is soluble and stable, may be employed. Likewise, water, or mixtures of water and an organic solvent, are suitable media, providing efficient contact of reactants is maintained. Product separation is accomplished by removing the desulfurizing agent and working up the organic product according to conventional procedure.

The preparation of the steroid aldehyde from a steroid thioester may be illustrated by the following sequence, wherein a simple unsubstituted steroid nucleus is shown:

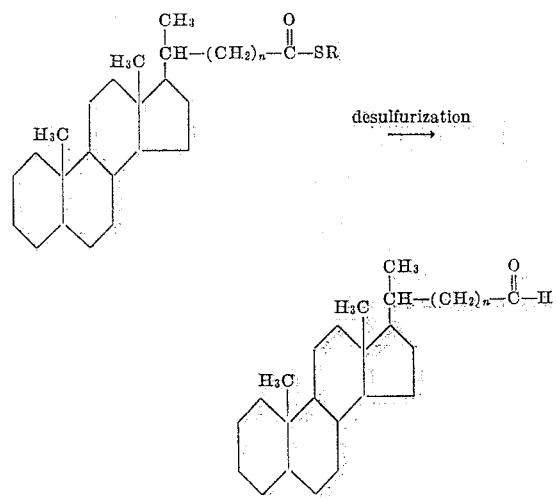

If desired, characterization of the aldehyde may be readily accomplished by formation of an aldehyde derivative such as the oxime, semicarbazone, or other well-known aldehyde derivatives.

The preparation of an aldehyde by desulfurization of the thioester is described in detail in the following illustrative examples, which, however, are not to be construed as limiting.

*Example 1.—3,12-diacetoxy-nor-cholanal-23*

A suspension of 10 grams of Raney nickel in 30 milliliters of acetone was heated under reflux for two hours, whereafter one gram of ethyl 3,12-diacetoxy-nor-thiocholanate in 20 milliliters of acetone, followed by 20 milliliters of water, was added thereto. The mixture was heated under reflux for 70 minutes, then cooled, filtered to remove Raney nickel, and concentrated in vacuo. The residue was extracted with ether, the ether solution washed with dilute acid, dilute alkali, and water, after which solvents were removed. The residue was treated with semicarbazide acetate to give 0.71 gram of the semicarbazone of 3,12-diacetoxy-nor-cholanal-23, M. P. 210–226 degrees centigrade. A sample recrystallized several times melted at 229–230.5 degrees centigrade.

*Example 2.—3-formyl-lithocholanal-24*

One gram of the thioethyl ester of 3-formyl-lithocholic acid was reduced to the aldehyde and isolated as the semicarbazone as described above. The yield of crude semicarbazone, M. P. 182–189 degrees centigrade, was 0.96 gram. After two crystallizations from toluene and methanol, 0.32 gram, melting at 215–216.5 degrees centigrade, remained.

ANALYSIS

Calculated ___ C, 70.074; H, 9.727; N, 9.43
Found _____ C, 70.37; H, 9.76; N, 9.60

The sample melting at 215–216.5 degrees centigrade, was suspended in ether, washed with water, and recrystallized to give a sample melting at 224–227 degrees.

*Example 3.—3-beta-acetoxy-(delta-5)-bisnor-cholenal-22*

A suspension of 5 grams of Raney nickel in 15 milliliters of acetone was heated under reflux for 2 hours, then 0.500 gram of ethyl 3-beta-acetoxy - (delta - 5) - bisnor - thiocholenate in 10 milliliters of acetone and 8 milliliters of water was added. The mixture was refluxed for two hours, allowed to cool slightly, and filtered to remove Raney nickel. The nickel was washed with methanol. Crystals began separating in the filtrate, which was placed in the refrigerator for three days; then separated by filtration. The filtrate was diluted with water, giving 197 milligrams of amorphous powder; M. P. 88–90 degrees centigrade. The amorphous powder (197 milligrams), 0.20 gram of semicarbazide hydrochloride, 0.3 gram of sodium acetate, 8 milliliters of 95 per cent ethanol, and 2.5 milliliters of water were heated under reflux for 2 hours, the reaction mixture cooled and diluted with water to give 246 milligrams of crystals, M. P. 190–200 degrees centigrade. After several crystallizations from absolute alcohol and water, the melting point rose to 215–218 degrees centigrade.

ANALYSIS

Calculated for $C_{25}H_{38}O_3N_3$ _____ N, 9.805
Found _____ N, 9.70

The powder, M. P. 88–90 degrees centigrade, was 3-beta-acetoxy-(delta-5)-bisnor-cholenaldehyde, which upon recrystallization melted at 101–108 degrees centigrade.

*Example 4.—3-alpha,12-alpha-diformoxy-cholanal-24*

Standard Raney nickel (20 grams) was added to 60 milliliters of acetone and heated under reflux with stirring for two hours. A solution of 2 grams of ethyl 3-alpha,12-alpha-diformoxy-thiocholanate (Preparation 2) in 40 milliliters of acetone and 40 milliliters of water was then added and refluxing continued for an additional hour. Catalyst was separated by filtration and the filtrate concentrated in vacuo to a volume of 50 milliliters, then extracted with ether (100 milliliters). The ether was washed with 100 milliliters of cold one per cent aqueous sodium hydroxide solution and one-normal hydrochloric acid, and then with 300 milliliters of water. After drying over anhydrous sodium sulfate and evaporating to dryness in vacuo, 1.8 grams of 3-alpha,12-alpha-diformoxycholanal-24 was obtained as a colorless oil.

The oil was dissolved in 80 milliliters of absolute alcohol, and 2 grams of semicarbazide hydrochloride and 3 grams of sodium acetate in 20 milliliters of water added thereto. The solution was refluxed for two hours, cooled, and the product precipitated by addition of 200 milliliters of water. The yield was 1.8 grams of the semicarbazone; M. P. 217-220 degrees centigrade after several recrystallizations from methanol.

The 2,4-dinitrophenylhydrazone was prepared by dissolving 860 milligrams of the crude aldehyde in 70 milliliters of absolute alcohol and adding 560 milligrams of 2,4-dinitrophenylhydrazine. The solution was heated to boiling, one milliliter of hydrochloric acid added, refluxing continued for 25 minutes, and the concentrate allowed to cool. The yield was 520 milligrams of the 2,4-dinitrophenylhydrazone, melting from 157 to 158 degrees centigrade.

*Example 5.—3-alpha,12-alpha-diformoxy-cholenal-24-(from benzyl thioester)-24*

This compound was also prepared from 4.5 grams of benzyl 3-alpha,12-alpha-diformoxy-thiocholanate (Preparation 1) and 40 grams of modified Raney nickel in 160 milliliters of acetone and 80 milliliters of water. The yield was 3.72 grams of the aldehyde, which was converted to the semicarbazone and 2,4-dinitrophenylhydrazone as in Example 4.

*Example 5.—3-hydroxy-(delta-5)-cholenal-24*

A solution of 555 milligrams of ethyl 3-beta-hydroxy-(delta-5)-thiocholenate, M. P. 100-102 degrees centigrade in a mixture of 15 milliliters of acetone and 5 milliliters of water, was heated under reflux for 1.5 hours with 3 grams of standard Raney nickel which had been modified by heating in acetone under reflux for 2 hours. The reaction mixture was filtered while hot, and the filtrate was cooled to zero degrees centigrade. A precipitate formed and was separated by filtration. The filtrate was diluted with water, giving 130 milligrams of a precipitate melting at 45 degrees centigrade. This was treated with 2,4-dinitrophenyl-hydrazine and a few drops of concentrated hydrochloric acid to give 65.6 milligrams of the 3-hydroxy-(delta-5)-cholenal-24 dinitrophenylhydrazone, M. P. 180-187 degrees centigrade. After crystallization from chloroform and alcohol, the compound melted at 183-189 degrees centigrade.

*Example 6.—3-acetoxy-(delta-5)-cholenal-24*

A solution of 1.00 gram of ethyl 3-beta-acetoxy-(delta-5)-thiocholenate (Preparations 3 and 4) in 30 milliliters of acetone and 10 milliliters of water was heated 70 minutes under reflux over 5.0 grams of standard Raney nickel which had been modified by heating in acetone. The reaction mixture was filtered while hot to remove the Raney nickel, and the filtrate was allowed to stand at room temperature, whereupon crystals formed. These were removed by filtration and the filtrate diluted with three volumes of water, giving approximately 500 milligrams of a solid melting at 95-120 degrees centigrade. When 240 milligrams of this precipitate was treated with 2,4-dinitrophenylhydrazine, 162 milligrams of the dinitrophenylhydrazone, M. P., 176-184 degrees centigrade, was obtained. After chromatographing and crystallization from acetic acid, the dinitrophenylhydrazone melted at 184-188 degrees centigrade.

Other 3-acyl esters, such as 3-beta-benzoyloxy-(delta-5)-thiocholenate, M. P. 168-172 degrees centigrade, are reduced to the aldehyde under the same conditions. Likewise, (delta-5)-thiocholenates having the double bond protected by conversion to the dihalide or hydrohalide are also reduced to the aldehydes under the conditions of the preceding examples.

Other aldehydes which may be prepared according to the method of the present invention are the following:

| Aldehyde | M. P., °C. |
| --- | --- |
| 6-methoxy-i-bisnor-cholenal-22 semicarbazone | 188-190. |
| 3-methoxy-(delta-5)-bisnor-cholenal-22 semicarbazone | 204-206. |
| 3-hydroxy-(delta-5)-bisnor-cholenal-22 semicarbazone | 241-242. |
| 3-benzoyloxy-(delta-5)-cholenal-24 dinitrophenylhydrazone | 232.5-233.5. |

The novel compounds of the present invention have the formula:

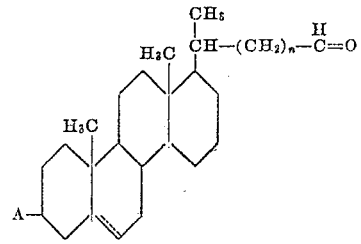

in which A is a hydroxyl or acyloxy radical, $n$ is the integer 1 or 2, the 5—6 bond is either a double bond or a double bond that has been converted to a single bond by addition of two atoms of a halogen or one molecule of a hydrogen halide.

Corresponding steroid aldehydes in which $n=0$, which are exemplified by 3-beta-acetoxy-(delta-5)-bisnor-cholenal-22 (also designated 3-acetoxy-5-ternorcholenyl formaldehyde) that is disclosed in Example 3 herein, are claimed in and may also be prepared by procedures that are described in the copending application of Frederick W. Heyl and Albert P. Centolella, Serial No. 159,376, filed May 1, 1950, which is a continuation-in-part of their application Serial No. 737,736, filed March 27, 1947.

Other representative aldehydes within the scope of the present invention are:

3-hydroxy-(delta-5)nor-cholenal-23,
3-propionoxy-(delta-5)-cholenal-24,
3-propionoxy-5,6-dichloro-cholanal-24, and
3-formoxy-(delta-5)-nor-cholenal-23.

The 3-acyl group may be varied widely, and may be, for example, formoxy, acetoxy, propionoxy, butyroxy, benzoxy ($C_6H_5COO$, also called benzoyloxy), and the like.

Various modifications may be made in the present invention without departing from the spirit or scope thereof, and it is to be understood that we limit ourselves only as defined in the appended claims.

We claim:

1. A process for the production of a steroid aldehyde having the formula

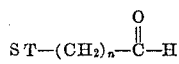

in which ST represents a steroid nucleus of the group consisting of pregnane, pregnene, and pregnadiene nuclei attached to the side-chain through the carbon atom at the 20 position of the steroid nucleus and $n$ is an integer of the group consisting of 0, 1 and 2, which comprises the desulfurization of a thioester of a steroid acid having the formula

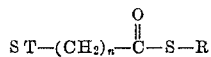

in which ST and $n$ have the significance assigned above and R is a residue of a thioalcohol, by reaction of the thioester with a substantial proportion of a Raney-type metal catalyst that has been modified by treatment with a hydrogen acceptor of the group consisting of compounds containing carbon-carbon double bonds and compounds containing carbon-oxygen double bonds, and subsequently recovering the steroid aldehyde from the reaction mixture.

2. A process as defined in claim 1 in which the desulfurization agent is a modified Raney nickel.

3. A process as defined in claim 1 in which the desulfurization agent is a Raney nickel modified by treatment with acetone.

4. A process as defined in claim 1 in which the desulfurization reaction is conducted at a temperature between approximately 15 and approximately 100 degrees centigrade.

5. A process as defined in claim 1 in which desulfurization reaction is conducted in a solvent medium.

6. A process for the production of a steroid aldehyde having the formula

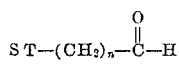

in which ST represents a steroid nucleus of the group consisting of pregnane, pregnene and pregnadiene nuclei attached to the side-chain through the carbon atom at the 20 position of the steroid nucleus and $n$ is an integer of the group consisting of 0, 1 and 2, which comprises mixing together, in the presence of an organic solvent, a thioester of a steroid acid having the formula

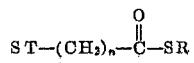

in which ST and $n$ have the significance assigned above and R is a thioalcohol residue, with a substantial proportion of a Raney-type metal catalyst that has been modified by treatment with a hydrogen acceptor of the group consisting of compounds containing carbon-carbon double bonds and compounds containing carbon-oxygen double bonds, at a temperature between approximately 15 and approximately 100 degrees centigrade, and subsequently recovering the steroid aldehyde from the reaction mixture.

7. A process as defined in claim 6 in which the desulfurization agent is a Raney nickel modified by treatment with acetone.

8. A process as defined in claim 6 in which the starting thioester is an ester of a thiocholanic acid.

9. A process as defined in claim 6 in which the starting thioester is an ester of a (delta-5)-thiocholenic acid.

10. A process as defined in claim 6 in which the starting thioester is a 3-hydroxy-(delta-5)-thiocholenate.

11. A process as defined in claim 6 in which the starting thioester is a 3-acetoxy-(delta-5)-thiocholenate.

12. A (delta-5)steroid aldehyde having the formula

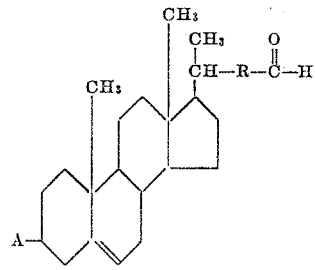

in which A is a radical of the group consisting of hydroxyl and radicals of the formula AcO, wherein Ac is the radical of an unsubstituted carboxylic organic acid containing up to and including seven carbon atoms, inclusive, and R is an alkylidene radical having fewer than three carbon atoms.

13. 3-acetoxy-(delta-5)-cholenal-24.
14. 3-hydroxy-(delta-5)-cholenal-24.
15. 3-benzoyloxy-(delta-5)-cholenal-24.

ROBERT H. LEVIN.
A VERN McINTOSH, Jr.
GEORGE B. SPERO.

No references cited.